United States Patent [19]

Petrich

[11] Patent Number: 5,028,746
[45] Date of Patent: Jul. 2, 1991

[54] CABLE PROTECTOR FOR WOUND CABLE

[75] Inventor: William E. Petrich, Golden Valley, Minn.

[73] Assignee: Rosemount Inc., Eden Prairie, Minn.

[21] Appl. No.: 401,090

[22] Filed: Aug. 31, 1989

[51] Int. Cl.⁵ .............................................. H02G 11/02
[52] U.S. Cl. ................................. 191/12.2 R; 73/756
[58] Field of Search ............... 191/12 R, 12.2 R, 12.4; 174/69; 73/717, 756

[56] References Cited

U.S. PATENT DOCUMENTS

| | | | |
|---|---|---|---|
| 4,201,278 | 5/1980 | Balde | 191/12.4 |
| 4,499,341 | 2/1985 | Boyd | 191/12.4 |
| 4,712,972 | 12/1987 | Nakashima et al. | 174/69 |
| 4,844,359 | 7/1989 | Kato | 191/12.2 R X |
| 4,855,539 | 8/1989 | Schabmuller | 191/12.2 A |
| 4,874,138 | 10/1989 | Kettenring | 191/12.2 R X |

FOREIGN PATENT DOCUMENTS

2041352 1/1971 France ............................ 191/12.4

Primary Examiner—David A. Bucci
Assistant Examiner—Scott L. Lowe
Attorney, Agent, or Firm—Kinney & Lange

[57] ABSTRACT

A cable protector comprises a cylindrical reel sleeve having an opening in the side wall, and one open end. A cable that is loosely, helically wound around a central axis to form a coil is inserted into the sleeve with one connector of the cable extending out through the bottom, and the other connector of the cable either retained in the interior of the sleeve or passing out through the opening of the side wall for connection to a second circuit board. The reel sleeve protects the helically wound cable from external damage, and the connector from the center can be coupled to a circuit board in a first transmitter housing, and retained in the protector to prevent damage to the cable during assembly of the housings. A second transmitter housing mounts a shroud that rotatably mounts the reel sleeve holding the cable, so that when the two transmitter housing sections are threaded together, the sleeve containing the wound cable will be guided into the shroud and will be permitted to rotate therein without damaging or twisting the cable as the two housing parts are threaded together or repositioned.

16 Claims, 6 Drawing Sheets

CABLE PROTECTOR FOR WOUND CABLE

BACKGROUND OF THE INVENTION

1. Field of the Invention

The present invention relates to a protector for minimizing circuit board cable damage when two independent housings carrying circuit boards that are connected by the cable are moved relative to each other.

2. Description of the Prior Art

In pressure transmitters that are conventionally made, there are usually two separate housings that are assembled. One of the housings is a sensor module housing which has connections for pressure fittings, and includes the actual pressure sensor and a circuit board that has signal conditioning electronic components on it. The second housing is the electronics assembly housing that includes a circuit board having additional circuit components, and includes ports in the housing for connectors leading to external wiring. The circuit board in the sensor module housing and the circuit board in the electronics assembly housing are connected with a cable that passes through interior openings or cavities in the housings.

In assembly, the cable is first soldered to the circuit board in a sensor module, and then the electronic assembly housing is threaded into place on the sensor module housing. It has been difficult in the past to avoid entanglement of the cable during this threading, and also in the past, problems have arisen after the cable has been connected to the circuit board in the electronics assembly housing if the electronics assembly housing has to be repositioned relative to the sensor module, which includes the fittings to the pressure lines. Strain on the cable can occur and in instances damage to the solder connections between the cable and the circuit board in the sensor module has resulted.

In servicing or repositioning the two housings, it is desirable to prevent strain from being placed on the solder connections and also to ensure that the cable itself is not pinched, crimped, or in some other way damaged. The present invention provides a reel-type retainer that will retain the cable in a wound, helical coil during assembly and during use so that the cable can be extended without fear of damaging it. The reel also acts as additional electrical insulation during use.

SUMMARY OF THE INVENTION

The present invention relates to a cable protector for a cable mounted between circuit boards in two relatively shiftable housings. The cable protector comprises a reel like sleeve that will retain a helically wound cable, that is wound around an axis transverse to the length of the cable into a coil. One end of the cable is extended out through a bottom opening of the sleeve, and the reel sleeve further has an opening in the side wall through which the second end of the cable may be extended. The second end may also be retained inside the reel sleeve for certain operations.

As shown, the reel sleeve is placed into a shroud or cable reel housing that is mounted in a second transmitter housing, and which is of size to rotatably mount the reel sleeve holding the wound cable. The shroud also has an opening in the side wall thereof and an open end that receives the reel sleeve.

When the two transmitter housings are put together, the reel fits within the outer shroud or reel housing and when the transmitter housings are rotated for threading, as shown, the inner reel sleeve will rotate in the outer shroud to insure that the cable is not twisted or damaged as the two transmitter housings are placed together. After the two transmitter housings are assembled, the second end of the cable can be removed through the side wall opening of the reel housing and the side wall opening of the reel and extended to connect to a circuit board in the second transmitter housing. Then if the transmitter housings are going to be repositioned, because the coil of cable that is within the reel sleeve is initially a relatively loose helical coil, as the connector on the second transmitter housing is moved away from the reel sleeve, the coil of cable inside the reel sleeve will tighten or loosen, depending on relative rotation to permit a portion of the cable to be extended from the reel. This permits the operator to change or reposition the two transmitter housings relative to each other for matching ports on one of the housings to its connections while the ports on the other housing can be positioned to match a desired location as well.

The reel sleeve and shroud are easily manufactured and installed in existing designs of transmitter housing assemblies, and greatly aid the assembly of the transmitter housings, as well as protecting the cable during repositioning or separation of the two transmitter housings relative to each other for meeting field conditions, or for service. The cable can be extended sufficiently to permit one housing to rotate relative to the other a full 720° with the present reel, without unduly stressing the solder connections of the cable to the one circuit board. Also, the cable itself will not be sheared by accidentally pinching it between the transmitter housings as they are assembled.

A further benefit of the present invention is that during use, the cable reel sleeve and the shroud or housing in which it is mounted, provide additional insulation protection, so that the cable is not in direct contact with the metal transmitter housings, to raise or improve the breakdown potential between the cable and the metal transmitter housings. Alternate ways of guiding the coil and reel are shown, and only one reel sleeve may be used for protection of the cable during operation.

DETAILED DESCRIPTION OF THE PREFERRED EMBODIMENTS

Figure 1:
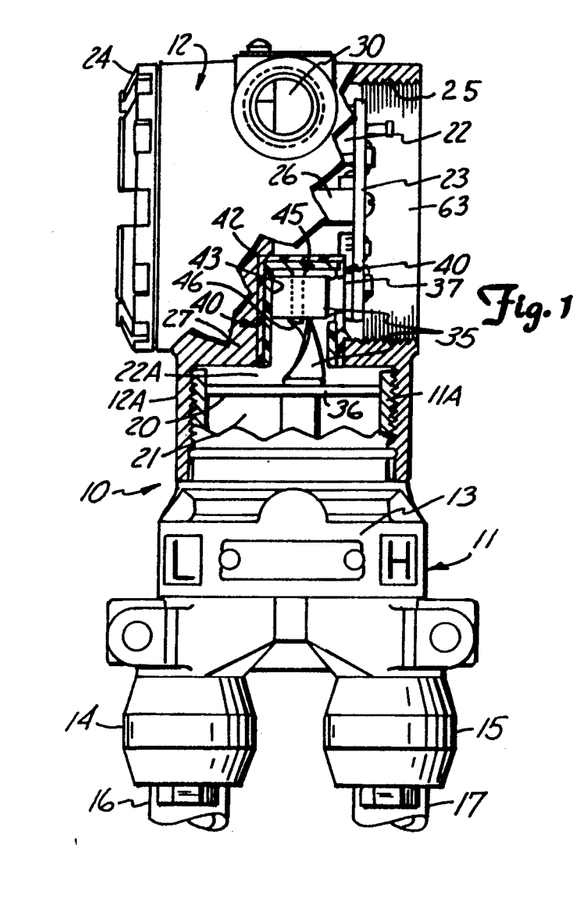
FIG. 1 is a side elevational view of a transmitter having a cable protector reel and shroud made according to the present invention and installed therein.

A pressure transmitter assembly indicated generally at 10 is of a standard design, which includes a sensor module housing 11, and an electronic assembly housing 12. The two housings are joined together by threaded necks, shown at 11A, for the interior neck that is on the sensor module portion, and a neck 12A on the electronic assembly housing 12 that is threaded on the interior neck 11A. Suitable seals can be provided for sealing the neck portions relative to each other as the parts are assembled. In use, the sensor module housing supports a pressure sensor inside the housing portion shown at 13, and the sensor is connected through fittings 14 and 15 (process connections) to pressure lines indicated at 16 and 17, respectively. The transmitter is a differential pressure transmitter, and the difference between the low pressure side and the high pressure side will be sensed by the sensor.

Figure 2:
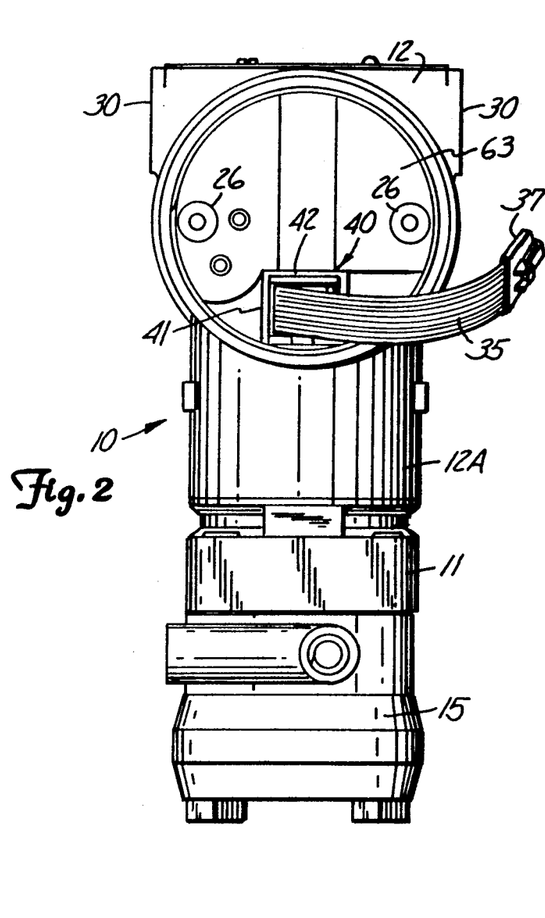
FIG. 2 is an end elevational view of the device of FIG. 1 with an outer cover and an electronics board removed.

A circuit board 20 is mounted in a suitable manner within the cavity 21 formed by the neck 11A of sensor module housing 11, which is open to an interior cavity 22 formed on the interior of the electronics assembly housing 12. Circuit board 20 can be a printed circuit board having suitable electronic components thereon for signal conditioning of the excitation signals to and pressure signals received from the sensor in the sensor module. The signals are further processed in the electronic components on a second circuit board 23 that is mounted inside the cavity 22 of the electronic assembly housing 12. The plane of circuit board 23 is perpendicular to the plane of circuit board 20. The electronic assembly housing 12 has a threaded end cap 24 and a similar cap mounted on threads 25 which provides access to the interior of the housing. The end cap mounted on threads 25 provides access to the circuit board 23 which is mounted with suitable screws to stand-off members 26. Additionally, suitable wall portions or internal blocks 27 are formed on the interior of the electronics assembly housing 12. The electronics assembly housing 12 has ports 30 therein for receiving fittings that connect outside components to the circuit board 23.

The signals that pass between the circuit board 20 and the circuit board 23 are carried by a flat, multiconductor printed circuit board connector cable 35. This cable 35 has one end soldered through solder connections indicated at 36 to a connector on board 20. Individual wires in the cable 35 are insulated by a thin insulation. The cable 35 then ends at an outer or second end with a connector 37. The connector 37 will couple to a suitable connector mounted on the back side of the circuit board 23. Cable 35 is formed to have a predisposition to a helical coil shape.

In the assembly of the transmitters, the sensor module is assembled with the circuit board 20 in place in sensor module housing 11 and the cable 35 has connectors 36 soldered to connections on board 20. A substantial length of cable is necessary because it is at times necessary to reposition the ports 30 for the electronic connections relative to the pressure fittings 14 and 15, in order to make the parts align. That, of course, is determined by field installations, and it is not known at the time of assembly what orientation of the ports and fittings is desired. Additionally, when the electronics assembly housing 12 is mounted onto the sensor module housing 11 by threading it in place with the threads between necks 11A and 12A, the circuit board 23 is left loose from its standoffs 26, so that in conventional installation, the cable 35 can be fished up through the cavity portion 22A that opens to the cavity 21 and to cavity 22. Doing this while maintaining the cable free of interference as the transmitter housings are rotated, can cause problems. Once the connector 37 is attached to the circuit board 23 and the circuit board is mounted in place, repositioning of the housings 11 and 12 relative to each other, or disassembly and reassembly can cause strain on the cable solder connections.

A cable protector assembly indicated generally at 40 is utilized to overcome problems with conventional assembly and mounting of the cable. The cable protector assembly 40 comprises two parts as shown. The first part is a cable reel sleeve 41, and an outer shroud or reel housing 42. These parts can be seen in FIG. 6, and also in FIGS. 4 and 5 in cross section. The cable reel sleeve is a cylindrical can-type member that has an outer cylindrical wall 43 and an open end indicated at 43A through which the cable 35 can extend. Additionally, the cylindrical wall 43 has an opening 44 therethrough, the opening 44 is of a vertical height in direction along the axis of the reel sleeve which is slightly greater than the width of the cable 35 that is being used.

Figure 4:
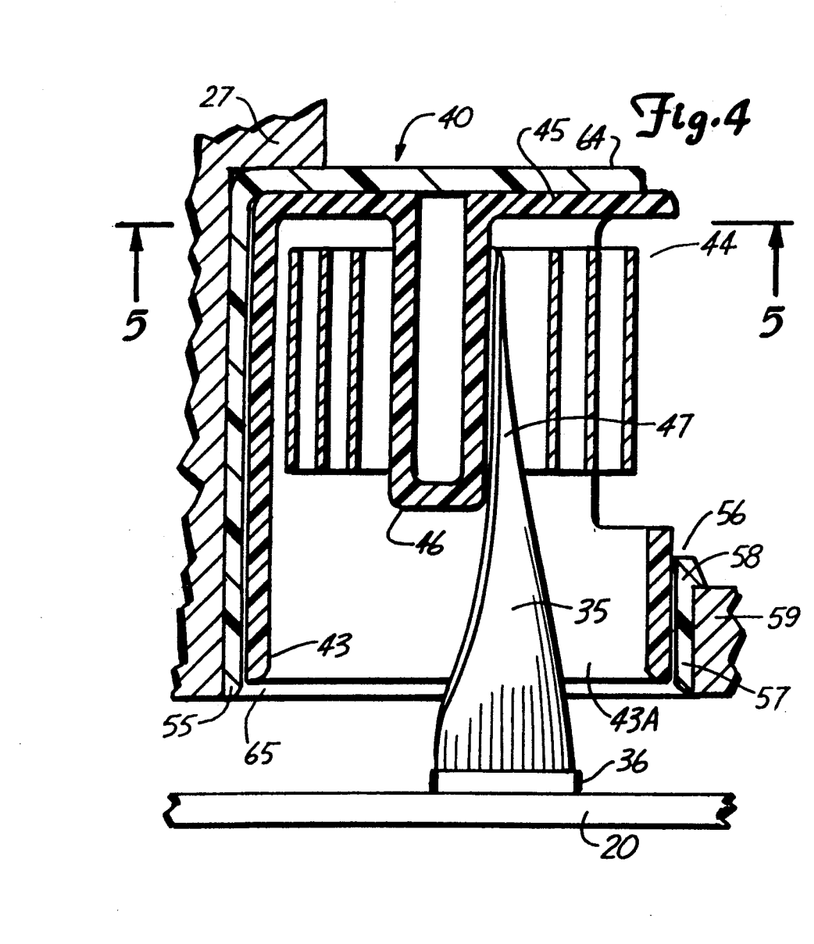
FIG. 4 is a vertical sectional view of enhanced scale showing a cable reel and shroud assembly made according to the present invention installed in a transmitter.
Figure 5:
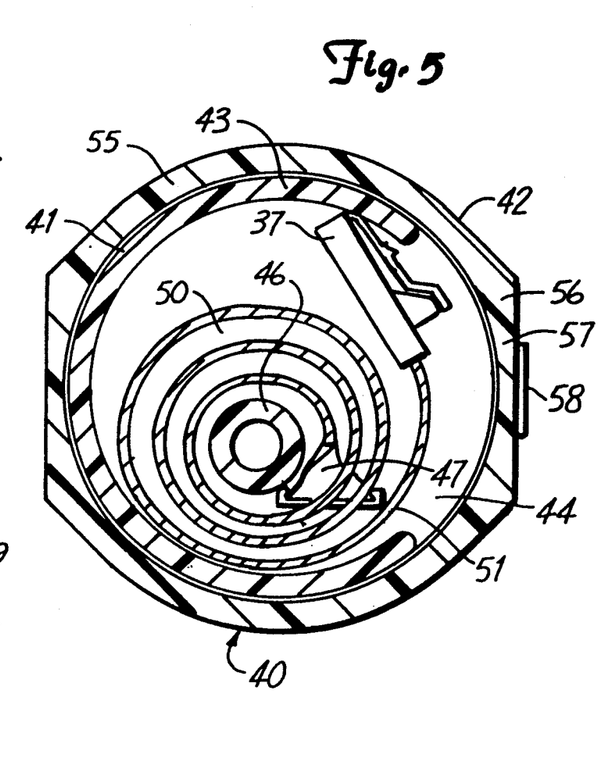
FIG. 5 is a sectional view taken as on line 5—5 in FIG. 4.
Figure 6:
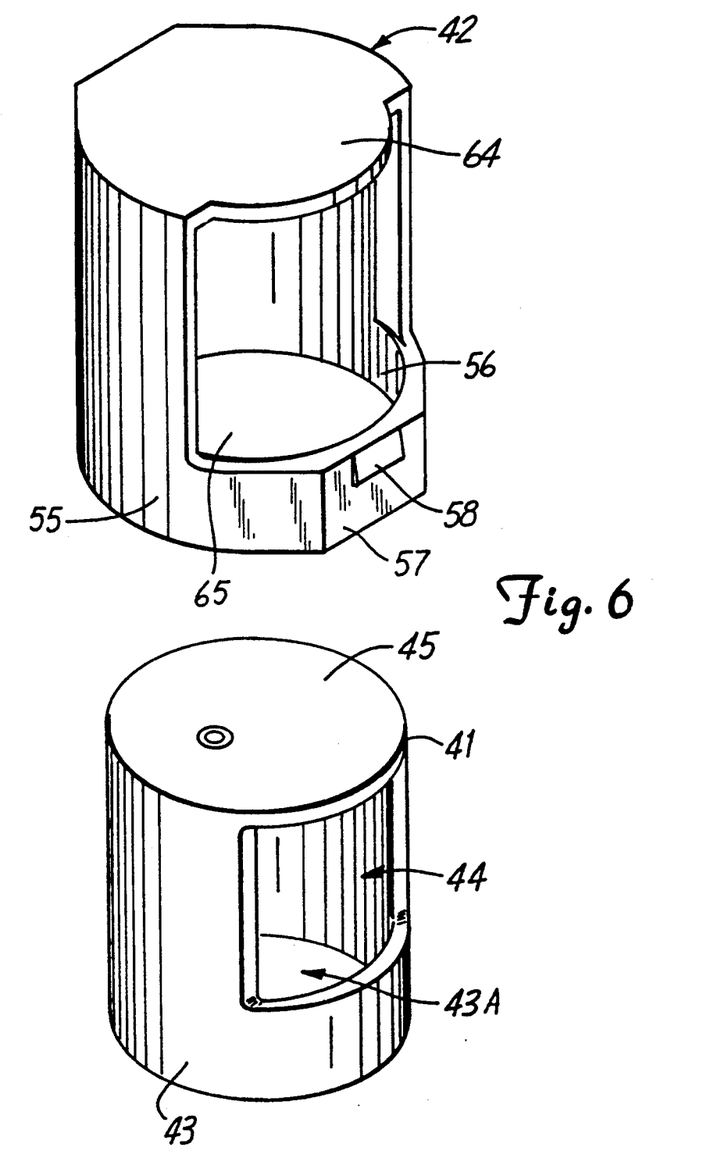
FIG. 6 is an exploded perspective view of the reel sleeve and shroud or reel housing to illustrate the making of the parts.

A closed end wall 45 on the reel sleeve has a spindle or dowel 46 extending downwardly from the wall 45 and offset from the central axis thereof. The spindle 46 extends downward to about the level of the lower edge of the side wall opening 44. Cable 35 can be formed to extend upwardly from the board 20 and wrapped in a loose helix around the spindle 46, as shown in FIGS. 4 and 5. The cable 35 at its connection point 36 defines a plane, and then a twist portion 47 is made to wrap the cable around the spindle 46 in loose coils. The coils as shown in FIG. 5 include spaces indicated at 50 between the individual coils, and as shown in solid lines, an outer wrapping or coil 51 can be formed with the connector 37 on the interior of the cylindrical wall 43 and positioned so that it will not pass out through the side wall opening 44 in the reel sleeve.

The outer shroud or reel housing 42 has an outer wall 55 that has a cylindrical inner surface defining an opening or cavity slightly larger in diameter than the cylindrical wall 43 of the reel sleeve, so that the reel sleeve will rotate on the inside of the shroud or reel housing 42 quite easily. Shroud or reel housing 42 has a side wall opening 56, and as shown, also has a front side wall portion 57 that has a small latch 58 adjacent the upper edge of the wall portion 57 that latches over a block portion 59 of the electronic assembly housing 12, to hold the reel sleeve housing in place against other wall portions 27 of the electronics assembly housing. The outer surface of the wall 55 of the shroud or reel housing 42 has flattened portions so that the rotational position of the shroud or reel housing will latch in position in the electronics assembly housing 12. This will position the opening 56 facing toward the access opening 63 and the circuit board 23. The end cap mounted on threads 25 is used after the board is in place. The reel housing or shroud 42 also has a top wall 64, and an open bottom 65 through which the reel sleeve-cable protector 41 can be inserted.

Figure 3:
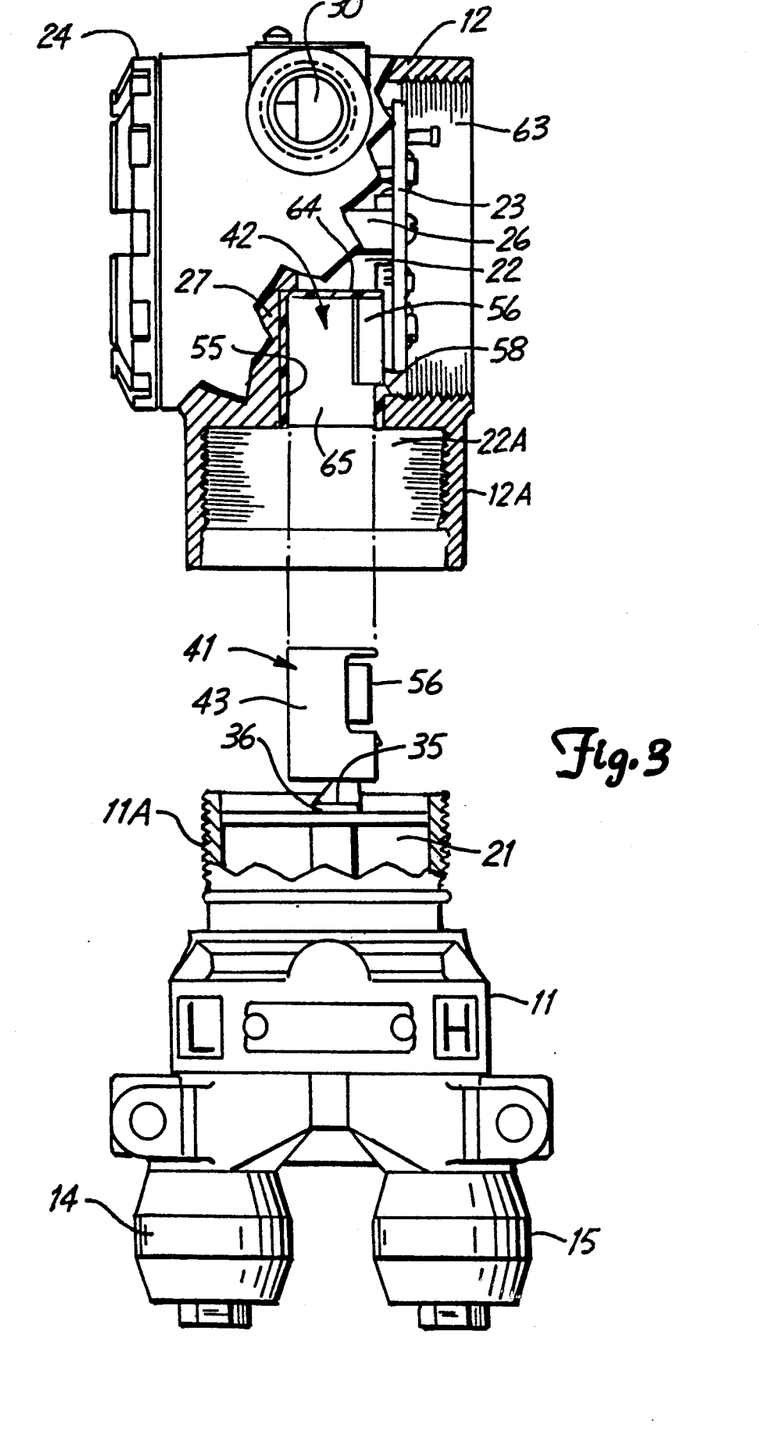
FIG. 3 is an exploded view of the two housing sections of a transmitter being assembled by rotary motion and showing the positioning of the cable reel and its outer shroud on the respective sections.

In assembly of the transmitter, as shown schematically in FIG. 3, with the cable 35 wound loosely and retained inside the reel sleeve 41, the reel sleeve 41 is separated from the shroud or reel housing 42. As the electronics assembly housing 12 and the sensor module housing 11 are moved together, so that their neck portions 11A and 12A are mating, the reel sleeve is aligned with the bottom opening 65 of the shroud or reel sleeve housing 42 and can quite easily be slipped up into the interior of the reel sleeve housing 42 and guided by the interior cylindrical surface. Then as the sensor module housing 11 and the electronics assembly housing 12 are rotated to thread them together, the reel sleeve 41 will be guided and will rotate within the shroud or reel sleeve housing 42 and there will be no substantial strain placed on the connectors for the cable relative to the board 20. There is thus no chance that the cable 35 will be pinched, or in some other way damaged by the relatively rotating housings as the assembly is made. Once the housings are together, the reel sleeve and shroud or reel sleeve housing will nest as shown in FIGS. 4 and 5, the end connector 37 can be fished out through the opening 44 in the side wall 43 of the reel sleeve, and also passed through the opening 56 of the wall 55 of the shroud or reel housing 42 so that the connector 37 can then be attached to the circuit board 23 (which is at right angles to the circuit board 20) by slightly tightening the coils of the wound cable on the interior of the reel sleeve and reducing the space indicated at 50 between the helical coils of the wound cable.

The spindle or dowel 46 insures that the cable will remain wound in a helix, that tightens or loosens as movement between the transmitter housings occurs so that strain would not be placed on the connectors 36. Spindle 46 acts as a "snubbing" post to prevent damage but yet provide a substantial amount of cable movement from the reel sleeve for accommodating connection to circuit board 23 and also to tighten or loosen to permit subsequent relative rotation between the two housings 11 and 12. The repositioning of the two housings 11 and 12 is easily accommodated by tightening the coils of the cable and reducing the space 50 between the coils. Because the cables are made of a material that has some springiness or memory, if the housings 11 and 12 are moved in a direction which would tend to loosen the cable coils, they will again tend to expand on the interior of the reel sleeve and tend to take up cable that otherwise might kink or twist.

It has been found that normal length cables that have been used and mounted in a reel as shown, will have enough springiness in the coil so that the transmitter housings 11 and 12 can be rotated relative to each other approximately 720° without damaging the cable 35. The cable 35 will not extend as the transmitter housings are rotated but the shroud 42 and reel sleeve 41 rotate with the electronic assembly housing 12 relative to connector 36 so the coils have to tighten or loosen to accomodate the rotation.

The reel sleeve 41 and the shroud or reel housing 42 are both made of an electrically insulating material and in use they will be positioned substantially as shown in FIGS. 1 and 4 and the wound portion of the cable 35 will be protected by two layers of dielectric material for most of its length, preventing cable abrasion or contact with metal housings and enhancing the breakdown potential between the wound portions of the cable and the metal housings 11 and 12.

The cable shroud or reel housing 42 remains fixed with the electronics assembly housing of the pressure transmitter. Its main function is to provide a housing for the cable reel sleeve 41 to rotate within and also for insuring there will not be any shorting of the cable directly to housing portions that are metal.

The cable reel sleeve or cable protector remains oriented with the sensor module housing 11 of the pressure transmitter and insulates the electronic board cable and retains it in a package that makes it easy to assemble the two transmitter housings 11 and 12 together. The dowel or spindle 46 provides a winding guide which retains the cable in a coil as it is extended by pulling out the outer end connected to connector 37 and allows the recoil action as the coils tend to again expand if there is no load on the outer end of the cable. As stated, the boards 20 and 23 are in perpendicular planes, and can be easily connected while permitting independent rotation of the boards in their own planes as well as about the axis of threading of the two housings 11 and 12.

Figure 7:
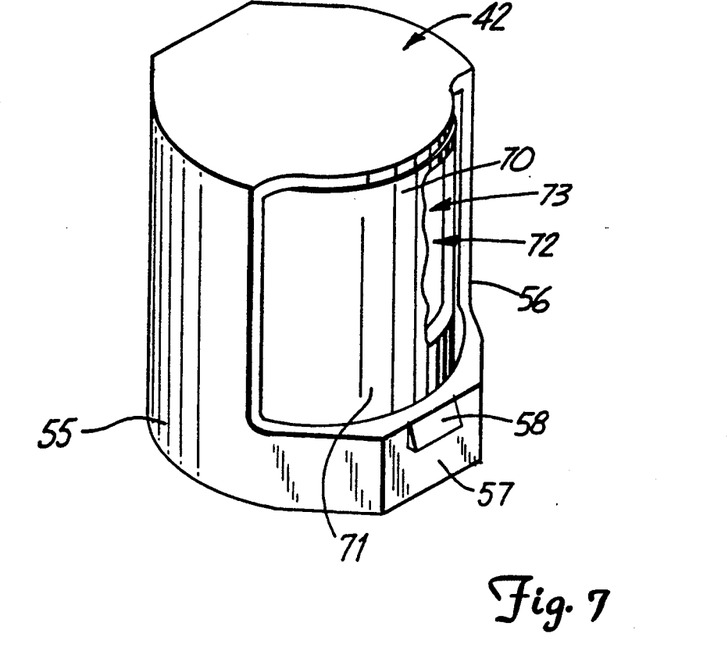
FIG. 7 shows a modified form of the reel sleeve.

A modified form of the invention is shown in FIG. 7, wherein the need for a spindle 46 is eliminated by properly providing a relatively narrow outlet slot or opening for the cable. In this form of the invention, the shroud or reel sleeve housing 42 is exactly as that previously described, including the side wall opening 56. However, while the cylindrical wall and general form of the reel sleeve is the same, this particular reel sleeve indicated at 70 has a side wall 71 and a side wall opening 73 but no dowel as in earlier embodiments. The reel sleeve housing 42 and the reel sleeve 70 are rotated in opposing directions so that sidewall openings 73 and 56 overlap to form a narrow slot opening 72. Slot opening 72 provides a guide for the cable as it exits and insures that the coils or windings on the interior of the reel sleeve remain intact for permitting movement of the transmitter housings without damaging the cable. The reel sleeve 70 is suitably guided in the outer shroud or housing 42 so that the slot 72 is oriented in the proper location. This can be done with a pin, or a small groove or catch that would retain the reel sleeve in its proper position.

Figure 8:
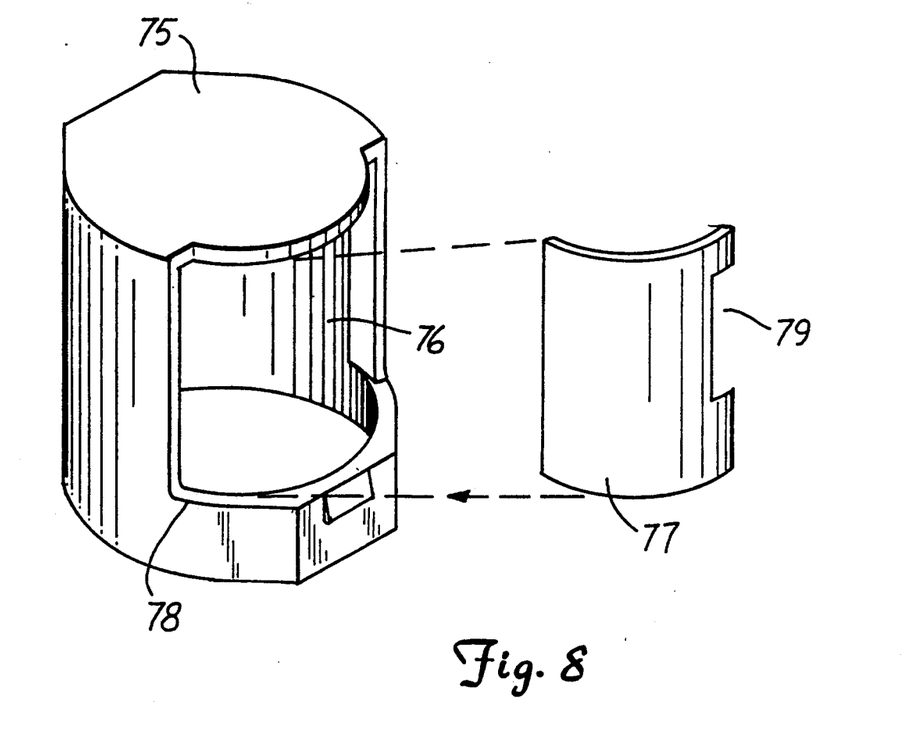
FIG. 8 is a further modified form of the invention where only one reel sleeve or housing is used for protecting the wound cable.

In FIG. 8, a further modified form of the invention is shown in exploded perspective view. In this form of the invention, there is no internal rotating reel sleeve inside the outer housing that is mounted in the electronic assembly housing. The housing shown at 75 is constructed the same as the shroud or reel sleeve housing 42, but the interior surface shown at 76 is cylindrical and made to guide the coiled or wound cable 35 on the interior thereof without any reel sleeve insert. The cable would be permitted to exit through a narrow slot, which would be formed in a door 77 that fits into an opening 78 defining a side wall of the shroud 75, and then latched in place. The door 77 has a slot 79 formed along one end thereof through which the cable could extend in the same manner as it extends out from the slot 72 of the form shown in FIG. 7. Thus, the housing shown in FIG. 8 can be used as a cable reel by itself and merely mounted or supported in the electronic assembly housing 12.

It should be noted that the shroud 75 can be attached to the walls of the electronic assembly housing in any desired manner, such as the use of a pin or latch extending through a hole in the top of the shroud.

Figure 9:
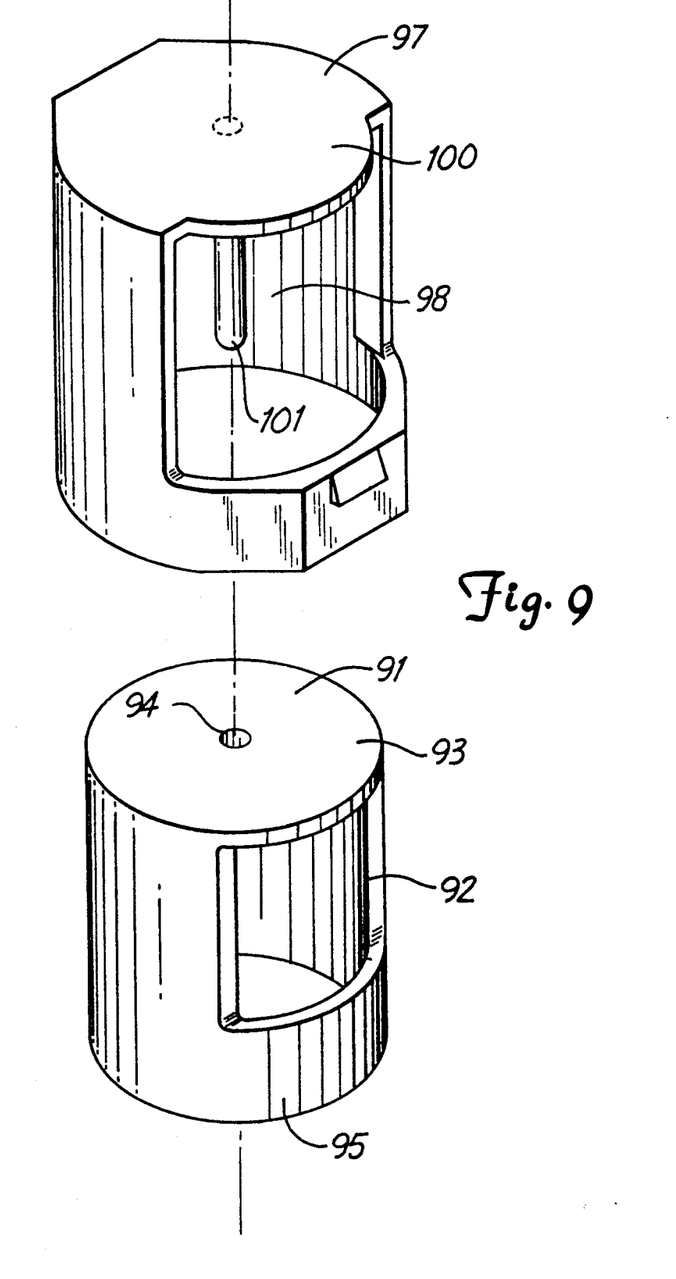
FIG. 9 is a still further modified form of the invention.

FIG. 9 shows a further modified form of the invention wherein a guide spindle or dowel is used, but in this form of the invention, the reel sleeve 91 is formed to have a side wall 95 with an opening 92 that is identical to the first form of the invention, but in place of a spindle, the top wall 93 of the reel sleeve has a hole or opening 94 therethrough. This hole or opening is on the center of rotation of the cylindrical wall 95 of the reel sleeve. The cable is placed into the reel sleeve 91 in the same manner as before, through the bottom opening, and retained in loose coils around the central axis. A shroud or reel sleeve housing 97 also shown in FIG. 9 in an exploded position, has an interior wall surface 98 that is of diameter to receive the outer surface of the wall 95 of the reel sleeve. The shroud also has a top wall 100 from which a spindle 101 depends. The spindle 101 is fixed to the top wall when the shroud is formed, and extends downwardly. The spindle 101 is on the central axis of the wall 98, and is designed so that it will fit through the aperture 94 and will aid in keeping the reel sleeve centered, as well as extending down through the coils of the wound portion of the cable that is within the reel sleeve 91. The spindle 101 thus performs two functions, guiding the reel sleeve, and also providing a guide for the wound coils or wound portions of the cable that are within the reel sleeve. The spindle retains the cable and allows for a recoil action during rotation of the electronic assembly housing and the sensor module housing as in the first form of the invention.

In all forms of the invention, the wound cable is protected by plastic insulating materials, and is maintained in a package that makes the transmitter housings easier to manipulate. The ability to change the coil size as the transmitter housings are repositioned is maintained in all forms of the invention, and where a single reel type construction is shown as illustrated, for example, in FIG. 8, a cable would be wound and placed manually into the reel that is retained in the electronic assembly housings during initial assembly of the two transmitter housings and then the cable could be fished out through the side opening and connected to the circuit board 23 in the electronic assembly housing.

Although the present invention has been described with reference to preferred embodiments, workers skilled in the art will recognize that changes may be made in form and detail without departing from the spirit and scope of the invention.

What is claimed is:

1. Apparatus mountable between process and signal connections, comprising:
    a pair of housings disposed between the process and signal connections forming a cavity between them having circuits therein, the housings being movable relative to each other to reposition the signal and process connections thereby changing the spacing between the circuits in each housing;
    a cable disposed in the cavity having ends connecting the circuits in each portion and having a wound portions; and
    a reel disposed in the internal cavity having the wound portion reeled generally about a winding axis therein to position the wound portion out of contact with the housings, the reel having an opening in one end through which one end of the cable extends to one housing, the one end of the cable being free to twist generally about the winding axis of the wound portion to change the size of the wound portion, the other end of the cable extending laterally through a wall of the reel to the other housing.

2. The apparatus of claim 1 wherein the wound portion permits changing the spacing between the cable ends as the housings move.

3. The apparatus of claim 1 wherein the reel further comprises a shell extending circumferentially around the wound portion.

4. The apparatus of claim 1 wherein the reel further comprises a central spindle.

5. The apparatus of claim 1 wherein the reel is formed of an electrically insulating material to raise the breakdown potential between the wound portion and the housings.

6. The apparatus of claim 1 wherein the cable comprises a printed circuit connector cable.

7. The apparatus of claim 1 wherein the housings are movable by rotating relative to one another such that the connections are rotationally adjusted with respect to one another.

8. The apparatus of claim 1 wherein the process connection comprises a flange coupling a pressure carrying line to the apparatus.

9. The apparatus of claim 1 wherein the one end of the cable extends from the center of the wound portion and the other end of the cable extends from the periphery thereof.

10. The apparatus of claim 9 wherein the reel has an opening in a side wall thereof to permit the other end of the cable to extend therethrough, the opening comprising a narrow slot to guide the cable.

11. The apparatus of claim 9 wherein the reel is a shell surrounding the wound portion, the wound portion being helically wound in a loose helix, the other end of the cable extending outwardly from an opening in the reel, and as the other end is extended, the helical windings of the cable becoming tighter.

12. The apparatus of claim 11 and an outer guide for the reel mounted on one housing, the reel moving with a second of the housings, the housings being rotatably movable relative to each other, and with the cable wound within the reel, the reel being rotatable in the outer guide as the one housing rotates.

13. A cable protector apparatus for use in assembly of two housing sections that have components therein to be connected by opposite ends of such cable comprising:
    a reel comprising an outer wall defining a cavity for receiving a loosely wound cable wound in a helix about an axis transverse to a longitudinal axis of the cable with a connector on one end of the cable on the interior of the cavity, the opposite end of the cable extending out from an end portion of said reel and being connected to a component in a first of said housings; and
    a guide shroud mounted in a second of said housings and having a cavity adapted to receive the reel to permit rotation of the reel about an axis, whereby when the two housings are moved together into an assembly the reel will slide into the cavity in the shroud.

14. The apparatus of claim 13 wherein the two housing portions are rotated relative to each other during assembly, and the reel rotates with respect to the shroud while retaining the cable on the interior thereof.

15. The apparatus of claim 14 and aperture means in said reel and in said shroud of size to permit the connector to be extended through said aperture means and pulled outwardly from the reel for connection of the connector to a second component in the second housing.

16. The apparatus of claim 13 wherein the reel has a narrow slot opening in a side wall thereof to guide the cable outwardly from the reel.

* * * * *